J. C. CLINEFELTER AND H. RIES.
METHOD FOR THE MANUFACTURE OF TIRES.
APPLICATION FILED JUNE 2, 1921.
1,407,839.
Patented Feb. 28, 1922
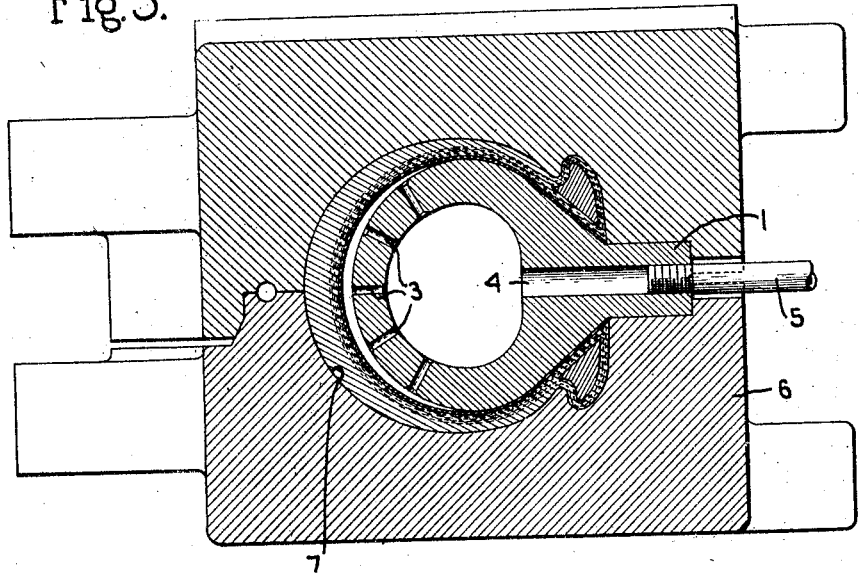
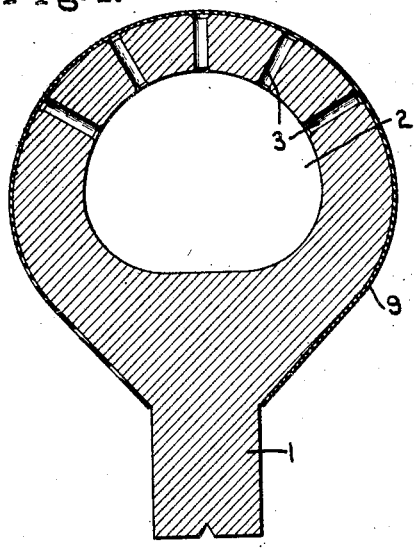
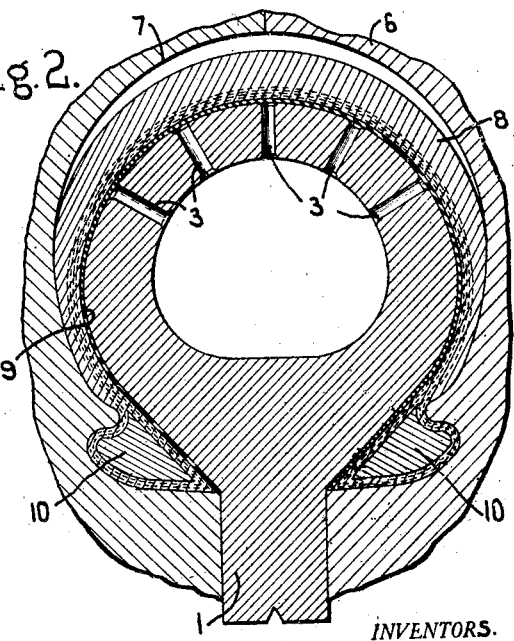
INVENTORS.
James C. Clinefelter
Herbert Ries
BY
ATTORNEY.

UNITED STATES PATENT OFFICE.

JAMES C. CLINEFELTER AND HERBERT RIES, OF BARBERTON, OHIO.

METHOD FOR THE MANUFACTURE OF TIRES.

1,407,839.   Specification of Letters Patent.   Patented Feb. 28, 1922.

Application filed June 2, 1921. Serial No. 474,324.

*To all whom it may concern:*

Be it known that we, JAMES C. CLINEFELTER and HERBERT RIES, citizens of the United States, residing at Barberton, Summit County, Ohio, have invented certain new and useful Improvements in Methods for the Manufacture of Tires, of which the following is a specification.

This invention relates to a new method or process for the manufacture of tires and is particularly intended for the production of the type of tire casing which is expanded under internal pressure and cured or vulcanized while in expanded condition.

The ordinary or commonly practised method in use at the present time in the manufacture of tires of the expanded type, consists briefly in removing the tire from the core on which it is built and inserting within the uncured tire casing, an expansible core, usually made of a number of layers of fabric and rubber. The expansible core or "air bag" as it is usually termed, and the tire are inserted within a mold having a cavity larger than the tire and the assembly placed in a heater or vulcanizer, the bag being connected with some suitable source of fluid pressure. After the mold is closed within the vulcanizer, pressure is admitted to the core which expands the tire outwardly against the mold cavity and the tire is cured while in expanded condition.

Tires manufactured in the manner described have many advantages, but the expansible cores or air bags are expensive to manufacture, and they have been unable, up to the present time, to stand up under the treatment which they receive and the successive heats to which they are subjected in the vulcanization of the tires, so as to average more than a limited number of cores.

By the present invention it is our purpose to eliminate the expansible core or air bag and by the methods described to construct a tire on the internal expansion principle which will possess all of the advantages of the present methods of manufacturing tires without the expense incident to the use of air bags.

Besides the expense connected with the manufacture of the air bags and the short life of bags, there are other disadvantages attendant upon their use, which are familiar to those skilled in the art, but the faults are remedied by the manufacture of tires in the manner disclosed herein.

While the description of the process will, of necessity, be somewhat detailed, in order to enable one skilled in the art to practice the invention, it will be understood that the invention is not confined to the details, but may be altered or modified within the scope of the invention.

In the drawings there are illustrated the several steps in the process in which—

Fig. 1 shows the core on which the tire is built ready for the manufacture of the tire.

Fig. 2 is a cross section through the completed tire ready for the vulcanizing operation.

Fig. 3 is a section through the mold and the expanded tire.

In order to carry out the invention, use is made of a building form of any preferred design, a core for the purpose being indicated by the numeral 1. In the center of the core, there is provided a chamber or cavity 2 which extends about the entire core and provides the means by which the pressure fluid is admitted to the tire, there being a plurality of apertures or ducts 3 which lead from the chamber 2 to the outer surface of the core. At a convenient point in the inner circumference of the tire there is provided an inlet 4 which connects the chamber 2 with the source of fluid pressure by any suitable means, illustrated by the pipe or conduit 5.

The mold is illustrated at 6 and is of any usual type, the cavity within which the tire is cured being indicated by the numeral 7, it being noted at this point that the cavity is larger than the uncured tire 8, so that expansion of the tire is obtained when fluid pressure is admitted during the curing operation.

In manufacturing a tire by the improved method, the core 1 serves as the ordinary building core, being mounted on a chuck in the usual tire building machine. In the usual steps of building a tire, the fabric to form the carcass is attached to the core directly. By the present invention however, a layer of cured or semi-cured rubber is interposed between the first ply of fabric and the core. This layer is indicated by the numeral 9 and may be smoothly applied to the ply of fabric prior to its application to the core or to the core directly so that it extends to the bead line, to form an impervious stretchable sheath or cover between the core and the tire carcass. If the layer of rubber is applied to the core, it is buffed and cemented so as to be adhesive and over the so formed adhesive rubber layer, the tire is built up in the usual manner.

When the tire is built it presents the appearance shown in Fig. 2 and is ready to be placed in the mold. The mold is then placed in the vulcanizer and the conduit to the interior of the core is connected to the source of fluid pressure. The pressure fluid passes through the aperture 3 and the tire is expanded outwardly into the position shown in Fig. 3, in which condition it is vulcanized in the usual way. The layer of rubber 9 takes the place of the expansible air bag formerly used and prevents the leakage of the fluid pressure into the tire structure. It will be noted that the lower inside surface of the mold around the beads 10 acts to compress the beads against the side of the core, which action is augmented by the pressure of the vulcanizer and thus forms a fluid tight joint so that the pressure fluid will not leak out around the edges of the tire. The layer of rubber 9 is semi-cured, as has been stated and during the vulcanization of the tire, this layer will receive its final cure and will become an integral part of the tire structure.

While the drawings show this invention as applied to the manufacture of clincher bead tires, it is obvious that with suitable changes which would suggest themselves to one skilled in the art, the invention could be adapted for the manufacture of other types of tires. It is not essential to build a complete tire prior to the expanding operation, as the principle of operation will apply to a partially finished tire in a two cure building operation.

It will be seen that by the provision of a semi-cured layer of rubber on the perforated core, it is possible to utilize fluid pressure in expansion of the tire prior to and during the curing operation without danger of the pressure fluid finding its way into the tire structure. The beads are firmly pressed against the core and the fluid will be prevented from leaking out around the edges of the casing. The expensive air bags or other expansible cores are eliminated with all of their attendant disadvantages, and the manufacture of the tires is cheapened and facilitated. The tire remains on the core on which it is built and the labor and expense of stripping the tire from the core, as in former practice, is avoided.

The layer of rubber which acts as the confining medium for the fluid pressure may be applied to the under surface of the first ply of fabric before the fabric is placed upon the core, either by calendering or placing it on the fabric by hand, or any other suitable method.

By the term "semi-cured" as applied to the layer of rubber 9, it is our intention to include all stages of vulcanization, it being possible to use a fully cured layer of rubber for the purpose, it being essential that the rubber be able to confine the fluid pressure without allowing it to permeate the confining layer.

Claims:

1. The process of manufacturing tires, comprising applying to a form a sheet of rubber in partially cured condition, preparing the outer surface of the rubber sheet to render it adhesive, building the tire carcass about the sheet of rubber, expanding the carcass by fluid pressure introduced between the form and the sheet of rubber and curing the tire, whereby the rubber sheet becomes an integral part of the tire structure.

2. In the process of curing tires while expanded by internal pressure, the step of interposing between the tire structure and the source of fluid pressure, a layer of semi-cured rubber, which becomes an integral part of the finished tire structure.

JAMES C. CLINEFELTER.
HERBERT RIES.